June 21, 1949.    H. KLEMPERER    2,473,592
ALTERNATING CURRENT PULSER CIRCUIT
Filed Jan. 25, 1946

INVENTOR
HANS KLEMPERER
BY
ATTY.

Patented June 21, 1949

2,473,592

UNITED STATES PATENT OFFICE 2,473,592

ALTERNATING CURRENT PULSER CIRCUIT

Hans Klemperer, Belmont, Mass., assignor to Raytheon Manufacturing Company, Newton, Mass., a corporation of Delaware Application January 25, 1946, Serial No. 643,422

4 Claims. (Cl. 323—89)

This invention relates to electrical circuits, and more particularly to an alternating current pulser.

An object of this invention is to provide a means for producing pulses through a load from an alternating current source.

Another object of the invention is to devise a simple yet effective circuit for producing voltage pulsations across a load without using any moving contacts.

A further object of the invention is to devise a circuit for producing voltage fluctuations of low periodicity from an alternating current source of higher periodicity.

A still further object of this invention is to accomplish the above objects in an inexpensive manner.

The foregoing and other objects of the invention will be best understood from the following description of an exemplification thereof, reference being had to the accompanying drawing, wherein.

Figure 1:
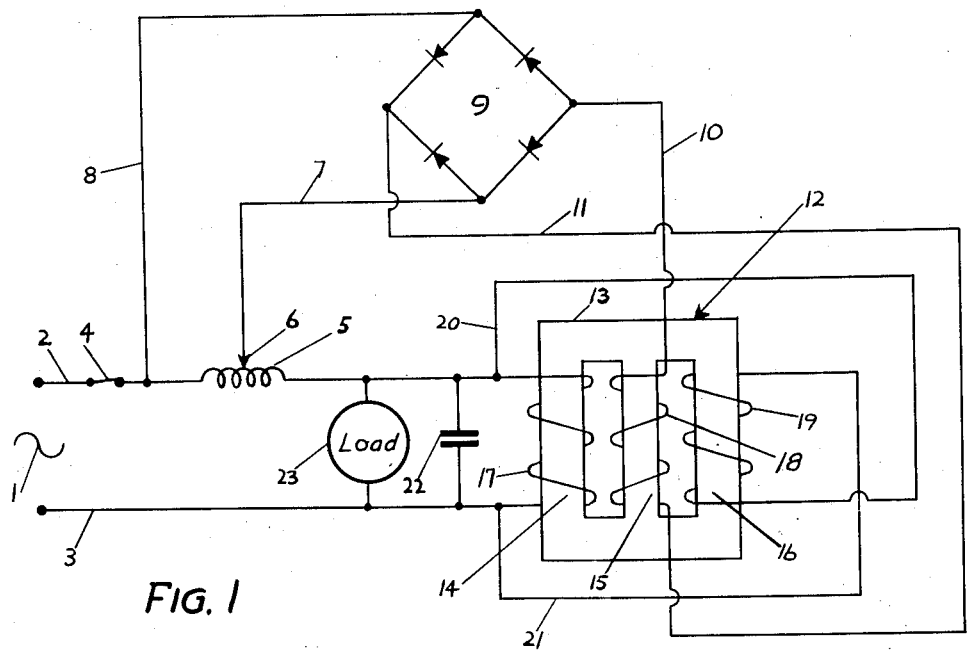
Fig. 1 is a diagrammatic representation of one form of the invention.

Referring to Fig. 1, a source of alternating current 1 of relatively low frequency, such as the ordinary 60-cycle power frequency, is connected to the circuit of this invention by means of leads 2 and 3. A switch 4 is inserted in lead 2, by operation of which switch the circuit may be connected to or disconnected from the source 1. Connected in series in lead 2 is an inductance or choke 5, which has an adjustable tap 6 thereon. This inductance is of the linear or air-core type. Conductor 8 is connected to lead 2 between inductance 5 and source 1, and conductor 7 is connected to tap 6 on said inductance. Rectifier 9 has its input terminals connected to conductors 7 and 8, so that the alternating voltage drop between the source end of inductance 5 and tap 6 is fed to said rectifier as its input. The rectifier 9 is illustrated diagrammatically as being a full-wave rectifying bridge. Any other rectifying arrangement could be used, such as, for example, a full-wave rectifying tube or tubes, or even a half-wave rectifier. The direct current output of rectifier 9 appears between leads 10 and 11.

A saturable reactor 12 is provided as a part of the circuit. This reactor consists of a three-legged core 13 having three legs 14, 15, and 16 on which are wound coils 17, 18 and 19 respectively. Lead 10 is connected to one end of the central or control coil or winding 18, while lead 11 is connected to the opposite end of coil 18. One end of coil or winding 19 is connected to lead 2 by means of conductor 20, while the opposite end of coil 19 is connected to lead 3 by means of conductor 21. One end of coil or winding 17 is connected directly to lead 2, while the opposite end of coil 17 is connected directly to lead 3, as shown. Coils 17 and 19 are therefore connected in parallel. Instead of coils 17 and 19 being in parallel, it is sometimes desirable to connect these coils in series with each other. Condenser 22 is connected directly across leads 2 and 3, so that it is effectively in parallel with coils 17 and 19. A load device 23 of any suitable type is connected between leads 2 and 3, in parallel with condenser 22 and coils 17 and 19. The connections to leads 2 and 3 of the load 23, the condenser 22, and the coils 17 and 19, are all made on the opposite side of inductance 5 from the source 1.

The saturable reactor 12 is of the three-legged type shown, in which direct current is applied to the control winding 18 in order to oppose or aid the magnetic flux in the two outer legs 14 and 16. For alternating currents, the coil 18 acts substantially as a short-circuited secondary winding because of its extremely low reactance, effectively providing a high reluctance flux path in the middle or central leg 15 so that the change of flux in this leg is a minimum and substantially no alternating voltage is induced in winding 18. Coils 17 and 19 are connected in the manner shown so that, for any particular half-cycle of alternating current, the fluxes in legs 14 and 16 flow in opposite directions, thus providing a continuous flux path or flow around the core's outer legs, also tending to keep alternating flux out of the central leg 15. Therefore, for any particular half-cycle, the direct flux from coil 18 will aid the flux in one outer leg, 14, for example, and will therefore drive it toward the point of saturation, while opposing the flux in leg 16. During the following half-cycle the fluxes in the outer legs will be reversed, so that the direct flux will drive leg 16 toward the point of saturation, while opposing the flux in leg 14. It is thus apparent that successive increases of fluxes in legs 14 and 16 will be produced during successive half-cycles of the alternating current in windings 17 and 19. When the magnetic flux in the outer legs of the core is driven toward the point of saturation, the effective reactance of the cooperating coil is reduced. Since the fluxes in the two outer legs 14 and 16 are driven successively and alternately toward saturation in successive and alternate half-cycles, and since the coils 17 and 19 are effectively in parallel across the source 1, it is clear that a continuous or full-wave reduction in effective reactance of coils 17 and 19 taken together may be obtained by the application of direct current to winding 18, and the greater the amount of this current, the greater will be the reduction in effective reactance of coils 17 and 19 because the nearer to saturation the legs will be driven. If the amount of direct current applied causes the legs 14 and 16 to be worked close to the knee of their magnetization curves, relatively large reductions in the effective reactance of coils 17 and 19 may be obtained. Also, the greater the slope of the magnetization curve of the material of the core, the greater is the rate of change of the effective reactance of the alternating-current coils.

When the switch 4 is closed to put the system into operation by connecting source 1 to the remainder of the circuit, a certain relatively small amount of current will start to flow through inductance 5 and coils 17 and 19. This current flowing through inductance 5 will produce a voltage drop therein, a portion of which voltage is taken off by conductors 7 and 8, is rectified by rectifier 9, and is applied as a direct current to control coil 13 of the saturable reactor. This control current will tend to drive legs 14 and 16 toward the point of saturation, as described above, and will thus reduce the effective reactance of coils 17 and 19. As the effective reactance of coils 17 and 19 decreases, the current flowing from the source through these coils, and also through inductance 5, will increase because of the reduced total impedance of the circuit, producing a greater voltage drop in inductance 5 and therefore more direct current in control winding 18, which will reduce the inductance of coils 17 and 19 still further, causing a still greater flow of current in inductance 5, and so on.

Condenser 22 has a value of capacitance such that, at the frequency of source 1, it will produce parallel resonance with a very low value of inductance. As the inductance of coils 17 and 19 continues to be decreased in the manner described above, eventually the point of parallel resonance, at the frequency of source 1, will be approached by the circuit 22, 17, 19. As is well known to those skilled in the art, a parallel resonant circuit, at or near the point of resonance, has a very high effective or resultant impedance as viewed from an external source. Therefore, as the circuit 22, 17, 19 approaches the point of resonance, it will act as a high impedance connected across the source 1, causing the current through series inductance 5 to decrease. Due to the relatively high electrical inertia of the resonant or tuned circuit 22, 17, 19, the current will continue to circulate in the tuned circuit for a short time even after the direct current applied to control winding 18 has begun to decrease because of the decreased voltage drop in inductance 5 due to the decreased current therein. This time lag will allow the decreased current in control winding 18 to return the effective inductance of coils 17, 19 to its original high value, the current through series inductance 5 meanwhile returning to its original value, that is, the value it had after switch 4 was first closed. Thus the original conditions of current flow in inductance 5, current flow in control winding 18, and effective reactance of coils 17, 19 are returned to, and the above process of decrease of reactance of the coils 17, 19 to the point of parallel resonance of network 22, 17, 19, etc. is repeated again, and is repeated periodically at a certain relatively low rate, for example three or four times per second.

In order to vary the rate at which the above current variations through inductance 5 take place, the position of tap 6 on inductance 5 may be adjusted to vary the relative amount of voltage drop which is taken off, rectified, and applied as direct current to control winding 18. Also, the value of capacitance of condenser 22 may be varied to vary the rate of current variations or pulsations, because this will change the relative value of inductance of coils 17, 19 at which network 22, 17, 19 becomes tuned. Also, to increase the periodicity of the pulsations, high-grade iron may be used for the core 13. Such iron has a magnetization curve of relatively high slope, so that a greater rate of change of effective reactance of the alternating-current coils may be obtained, as stated above, and therefore also a more rapid reaching of the point of parallel resonance of circuit 22, 17, 19.

Figure 2:
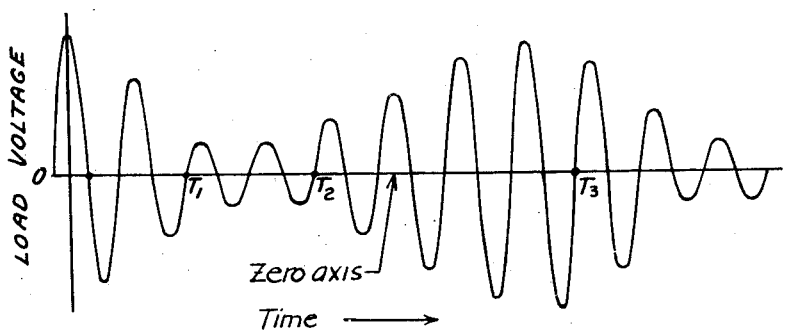
Fig. 2 is a schematic representation explaining the operation of the arrangement shown in Fig. 1.

In Fig. 2, the oscillogram represents, schematically, the variations of voltage across load 23 with time. It will be appreciated that the voltage across load 23 is at all times equal to the voltage of the source less the voltage drop through series inductance 5. At zero time, when switch 4 is first closed, there is a minimum current through inductance 5, a minimum voltage drop therein, and therefore relatively high load voltage, as shown. As the current through inductance 5 rises, due to the decrease in effective inductance of coils 17, 19 in the above-described manner, the voltage drop in inductance 5 rises also and therefore the net load voltage falls, as shown between zero and $T_1$. Between $T_1$ and $T_2$ the net load voltage remains at this low value. When the circuit 22, 17, 19 begins to approach the point of resonance, as described above, it acts as a high effective impedance, reducing the current through impedance 5 and therefore the voltage drop therein, and causing the net load voltage to rise as shown between $T_2$ and $T_3$. At or approximately the point $T_3$, the current through inductance 5 again reaches the original low value, producing a minimum voltage drop therein and therefore a relatively high load voltage again. Beyond point $T_3$ the effective inductance of coils 17, 19 is again decreased, again increasing the current flow and the voltage drop in inductance 5 and again decreasing the net load voltage, as shown. The above-described load voltage fluctuations are periodically repeated, producing periodic load voltage pulsations which may be used to ring a bell or flash a light or for any other desired purpose.

It will be appreciated that the showing in Fig. 2 is merely schematic, since the load voltage is there represented as approximately a sine wave. Actually, of course, due to the presence of iron in the circuit and due to resonance phenomena, the load voltage is more peaked than a pure sinusoid.

It has been found that it is not always necessary that the elements of circuit 22, 17, 19 have such impedance values that said circuit will become resonant or tuned at the frequency of source 1. Instead, these elements may have such values that the circuit 22, 17, 19 will become resonant at an odd harmonic of the source frequency. As is known, if a circuit contains iron, such as core 13, marked harmonics may be present in the current in windings 17, 19 which are not present in the impressed voltage of the source, these harmonic frequencies being kept away from the source by inductance 5 which acts as a choke for such frequencies. The effect of resonance, with its consequent variations of impedance of the tuned circuit and of current in the series circuit, may be attained at one of these higher values of frequency, if the elements have the proper impedance values. In this case, the circuit operates substantially as described above for the fundamental, and voltage pulsations are again produced periodically across the load.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. An alternating current pulser, comprising a source of alternating current, capacitive means connected across said source, a saturable-core reactor having a control winding and an alternating current winding, means connecting said alternating current winding across said source, said capacitive means and the inductance of said alternating current winding constituting a parallel circuit resonant at the frequency of said source when the core of said reactor is substantially saturated and said circuit being capable of being brought into and out of resonance by variation of the current flowing through said control winding, an impedance connected in series with said parallel circuit, and means responsive to the current flowing through said impedance for supplying control current to said control winding.

2. An alternating current pulser, capacitive means connected across said source, a saturable-core reactor having a control winding and an alternating current winding, means connecting said alterating current winding across said source, said capacitive means and the inductance of said alternating current winding constituting a parallel circuit resonant at the frequency of said source when the core of said reactor is substantially saturated and said circuit being capable of being brought into and out of resonance by variation of the current flowing through said control winding, an impedance connected in series with said parallel circuit, and rectifying means responsive to the current flowing through said impedance for supplying pulsating direct current to said control winding.

3. An alternating current pulser, comprising a source of alternating current, a condenser connected across said source, a saturable-core reactor having a control winding and an alternating current winding, means connecting said alternating current winding across said source, said condenser and the inductance of said alternating current winding constituting a parallel circuit resonant at the frequency of said source when the core of said reactor is substantially saturated and said circuit being capable of being brought into and out of resonance by variation of the current flowing through said control winding, an impedance connected in series with said parallel circuit, load means connected in parallel with said parallel circuit, and rectifying means responsive to the current flowing through said impedance for supplying direct current to said control winding.

4. An alternating current pulser, comprising a source of alternating current, a capacitance connected across said source, a saturable-core reactor having a control winding and an alternating current winding, means connecting said alternating current winding across said source, said capacitance and the inductance of said alternating current winding constituting a parallel circuit resonant at the frequency of said source when the core of said reactor is substantially saturated and said circuit being capable of being brought into and out of resonance by variation of the current flowing through said control winding, an impedance connected in series with said parallel circuit, load means connected directly across said parallel circuit, a rectifier having an input and an output, means connecting said input across said impedance, and means connecting said output across said control winding.

HANS KLEMPERER.

REFERENCES CITED

The following references are of record in the file of this patent:

UNITED STATES PATENTS

| Number | Name | Date |
|---|---|---|
| 1,885,155 | Suits | Nov. 1, 1932 |
| 1,921,789 | Suits | Aug. 8, 1933 |
| 2,358,394 | Haug | Sept. 19, 1944 |